(12) United States Patent
Abrams

(10) Patent No.: US 11,622,539 B2
(45) Date of Patent: Apr. 11, 2023

(54) SYSTEM FOR SIMULTANEOUSLY RESTRAINING A PLURALITY OF CHILDREN OR PETS IN AN UNTANGLE POSITION DURING USE

(71) Applicant: Eric Lenard Abrams, Abrams, GA (US)

(72) Inventor: Eric Lenard Abrams, Abrams, GA (US)

( * ) Notice: Subject to any disclaimer, the term of this patent is extended or adjusted under 35 U.S.C. 154(b) by 143 days.

(21) Appl. No.: 17/248,535

(22) Filed: Jan. 28, 2021

(65) Prior Publication Data

US 2021/0227793 A1 Jul. 29, 2021

Related U.S. Application Data

(60) Provisional application No. 62/966,613, filed on Jan. 28, 2020.

(51) Int. Cl.
*A01K 27/00* (2006.01)

(52) U.S. Cl.
CPC .......... *A01K 27/004* (2013.01); *A01K 27/002* (2013.01)

(58) Field of Classification Search
CPC .... A01K 27/002; A01K 27/00; A01K 27/005; A01K 27/0011; A01K 27/003; A01K 27/004; A01K 27/008; A47D 13/086; A41D 13/0007; A61B 5/02438; A61B 5/6831; A61B 5/6805

See application file for complete search history.

(56) References Cited

U.S. PATENT DOCUMENTS

| | | | | |
|---|---|---|---|---|
| 3,004,519 | A * | 10/1961 | Weissman | A47D 15/006 182/4 |
| 3,721,216 | A * | 3/1973 | Lippe | A01K 27/00 273/DIG. 19 |
| 4,667,624 | A | 5/1987 | Smith | |
| 4,945,861 | A * | 8/1990 | de Koning | A01K 27/00 119/905 |
| 5,080,045 | A * | 1/1992 | Reese | A01K 27/005 119/770 |
| 5,161,486 | A * | 11/1992 | Brown | A01K 27/00 119/776 |
| 5,259,338 | A | 11/1993 | Cornell | |
| 5,718,189 | A | 2/1998 | Blake | |
| 5,842,444 | A * | 12/1998 | Perrulli | A01K 27/003 119/857 |
| 6,152,338 | A * | 11/2000 | Smith | A45F 3/14 224/675 |
| 6,851,393 | B2 | 2/2005 | Bremm | |
| 6,932,027 | B1 | 8/2005 | Whitney | |
| 7,467,604 | B1 * | 12/2008 | Werner | A01K 27/005 119/770 |

(Continued)

*Primary Examiner* — Kristen C Hayes
(74) *Attorney, Agent, or Firm* — Dunlap Bennett & Ludwig, PLLC

(57) ABSTRACT

A restraint system for simultaneously maintaining a plurality of animate objects in an untangled position while the user is hands free is provided. The present invention embodies a 360-degree waist harness that operatively associates with a plurality of retractable bungee assemblies, each bungee assembly adapted to removably attach to a comprehensive vest or harness or a child or a pet, respectively. The bungee assemblies are selectively releasable from the 360-degree belt or the comprehensive vest or harness.

3 Claims, 7 Drawing Sheets

(56) References Cited

U.S. PATENT DOCUMENTS

| | | | |
|---|---|---|---|
| 8,342,137 B1 | 1/2013 | Burkhardt | |
| 8,413,613 B1* | 4/2013 | Smith | A01K 27/00 |
| | | | 119/797 |
| 8,534,233 B1* | 9/2013 | Han | A01K 27/003 |
| | | | 119/795 |
| 8,714,114 B1 | 5/2014 | Wang et al. | |
| 8,776,266 B1* | 7/2014 | Metz | A41D 13/0007 |
| | | | 2/93 |
| 9,089,124 B1* | 7/2015 | Cox | A01M 31/06 |
| 9,392,771 B1* | 7/2016 | Sauer | A01K 27/004 |
| 9,839,248 B1* | 12/2017 | Roberson | A01K 1/06 |
| 10,085,502 B1 | 10/2018 | Trepanier | |
| 10,188,080 B2* | 1/2019 | Jasmine, Sr. | A01K 29/00 |
| 10,477,839 B2 | 11/2019 | Gonterman | |
| 10,548,292 B2* | 2/2020 | Daerr | A01K 1/04 |
| 10,639,516 B2* | 5/2020 | Thomas | A63B 21/0004 |
| 2004/0112303 A1* | 6/2004 | Moulton, III | A01K 27/003 |
| | | | 119/795 |
| 2010/0089338 A1* | 4/2010 | Stern | A47D 13/086 |
| | | | 119/770 |
| 2012/0067297 A1* | 3/2012 | Reyes | A01K 27/003 |
| | | | 119/857 |
| 2013/0042818 A1* | 2/2013 | Capoano | A01K 27/00 |
| | | | 119/770 |
| 2013/0042819 A1* | 2/2013 | Ekstrum | A01K 27/00 |
| | | | 119/770 |
| 2013/0047312 A1* | 2/2013 | Wilson | A41D 13/0012 |
| | | | 2/69 |
| 2015/0013619 A1* | 1/2015 | Kahana, Jr. | A01K 1/04 |
| | | | 119/770 |
| 2015/0053734 A1* | 2/2015 | Smith | A01K 27/005 |
| | | | 224/576 |
| 2015/0099251 A1* | 4/2015 | Anderson | A63B 69/18 |
| | | | 434/253 |
| 2016/0338322 A1* | 11/2016 | Letke | A01K 27/003 |
| 2017/0360009 A1 | 12/2017 | Anderson | |
| 2017/0367300 A1 | 12/2017 | Hampton | |
| 2019/0059325 A1 | 2/2019 | DeLuccia et al. | |
| 2019/0380310 A1* | 12/2019 | Schneider | A01K 27/006 |
| 2020/0100469 A1* | 4/2020 | Elam | A01K 27/008 |
| 2020/0214259 A1* | 7/2020 | Johnson | A01K 27/003 |
| 2021/0144967 A1* | 5/2021 | Albakri | A45B 11/02 |
| 2021/0169417 A1* | 6/2021 | Burton | A61B 5/4857 |

* cited by examiner

SYSTEM FOR SIMULTANEOUSLY RESTRAINING A PLURALITY OF CHILDREN OR PETS IN AN UNTANGLE POSITION DURING USE

CROSS-REFERENCE TO RELATED APPLICATION

This application claims the benefit of priority of U.S. provisional application No. 62/966,613 filed 28 Jan. 2020, the contents of which are herein incorporated by reference.

BACKGROUND OF THE INVENTION

The present invention relates to child and/or pet restraining systems and, more particularly, a restraint system for simultaneously maintaining a plurality of animate objects in an untangled position during walking conditions. The restraint system may include a 360-degree waist harness operatively associated with a plurality of retractable bungee assemblies, each bungee assembly adapted to attach to a comprehensive vest or harness of a child or pet, respectively.

Unfortunately, we live in a time of human trafficking. The safety of children is paramount. Being able to retain their innocence without paranoia and allowing playtime while taking care of parental duties is key.

Unruly or active pets becoming lost, stolen, or having brutal altercations with other animals due to lack of proper restraints.

Furthermore, there is an inability of tracking either missing pets or missing children.

Current restraint systems for children and/or pets may constrain or constrict the children or pets in an unsafe manner, wherein there is no instant release, and otherwise limits freedom of the child or pet being protected.

As can be seen, there is a need for a restraint system for simultaneously maintaining a plurality of animate objects in an untangled position while the user is hands free. The present invention embodies a 360-degree waist harness that operatively associates with a plurality of retractable bungee assemblies, each bungee assembly adapted to removably attach to a comprehensive vest or harness or a child or a pet, respectively. The bungee assemblies are selectively releasable from the 360-degree belt or the comprehensive vest or harness.

The 360-degree revolution belt provides safety while the children or pets are at play with no tangling. The present provides an instant release functionality that can be selectively applied to one or more of a plurality of restrained child or pet. Furthermore, when the child (or pet) is released and missing, the comprehensive vest or harness provides a hidden e-tag that enables a software application for tracking the missing pet or child. The comprehensive vest has a built-in walkie-talkie above the breastbone of the child wearer.

As a result, the present invention allows a child (or pet) to wander within a predetermined distance of their guardian, while the guardian handles tasks hands free. When detached from present invention, a systemic software application will be able to locate children (and pets). As mentioned above, the present invention enables the guardian to store necessary items on the child or pets. The present invention also allows the guardian to store items on their person with a fanny pack attachment to the 360-degree belt.

SUMMARY OF THE INVENTION

In one aspect of the present invention, a wearable restraint system for simultaneously maintaining a plurality of living beings in an untangled position, includes the following: a waist belt having a track around substantially an entire circumference of the waist belt; one or more bungee assemblies operatively associated with the track in such a way that each bungee assembly rides along the track; each bungee assembly having an elastic portion that terminates in a bungee connector; and one or more wearable harnesses, each wearable harness having one or more attachment points configured to be adjacent a shoulder blade of a living being wearing the wearable harness, wherein each attachment point is configured to removable connect to each bungee connector.

In another aspect of the present invention, the wearable restraint system of further includes a constrict bars having either a U shape, Y-shape, or T-shape, wherein the leg of the U, T, or Y-shape has an attachment point, wherein the two arms of the U, T or Y-shape each have a bungee connector, and wherein the one or more attachment points comprise two attachment points, each attachment point configured to be adjacent a respective shoulder blade of said living being, wherein each wearable harness comprises a hidden e-tag, wherein each bungee assembly has a support arm extending between the elastic portion and a pivotable connection; and a retractable stop/release button on each bungee assembly, wherein the retractable stop/release button is configured to extend, retract, and lock the elastic portion. The bungee support arm attached to and controlling the constrict bars U, Y, or T-shape extension or attachments, while in use may extend and lock in an upward motion above an animate objects neck and head to avoid tangling and give a feeling of forward motion or momentum, upon activation of the upward extension button or valve. While allowing the bungee to extend outward for motion or movement. The U, Y, or T-shaped constrict bar may be an added attachment in the forms indicated. While a single attachment to the cervical area, rhomboid area, or lumbar area attachment are options as well and indicated in the design.

The track may extend around the entire circumference of the waist belt. By substantially an entire circumference of the waist belt may be between 75% to 100% of the circumference thereof.

These and other features, aspects and advantages of the present invention will become better understood with reference to the following drawings, description and claims.

DETAILED DESCRIPTION OF THE INVENTION

Figure 1:
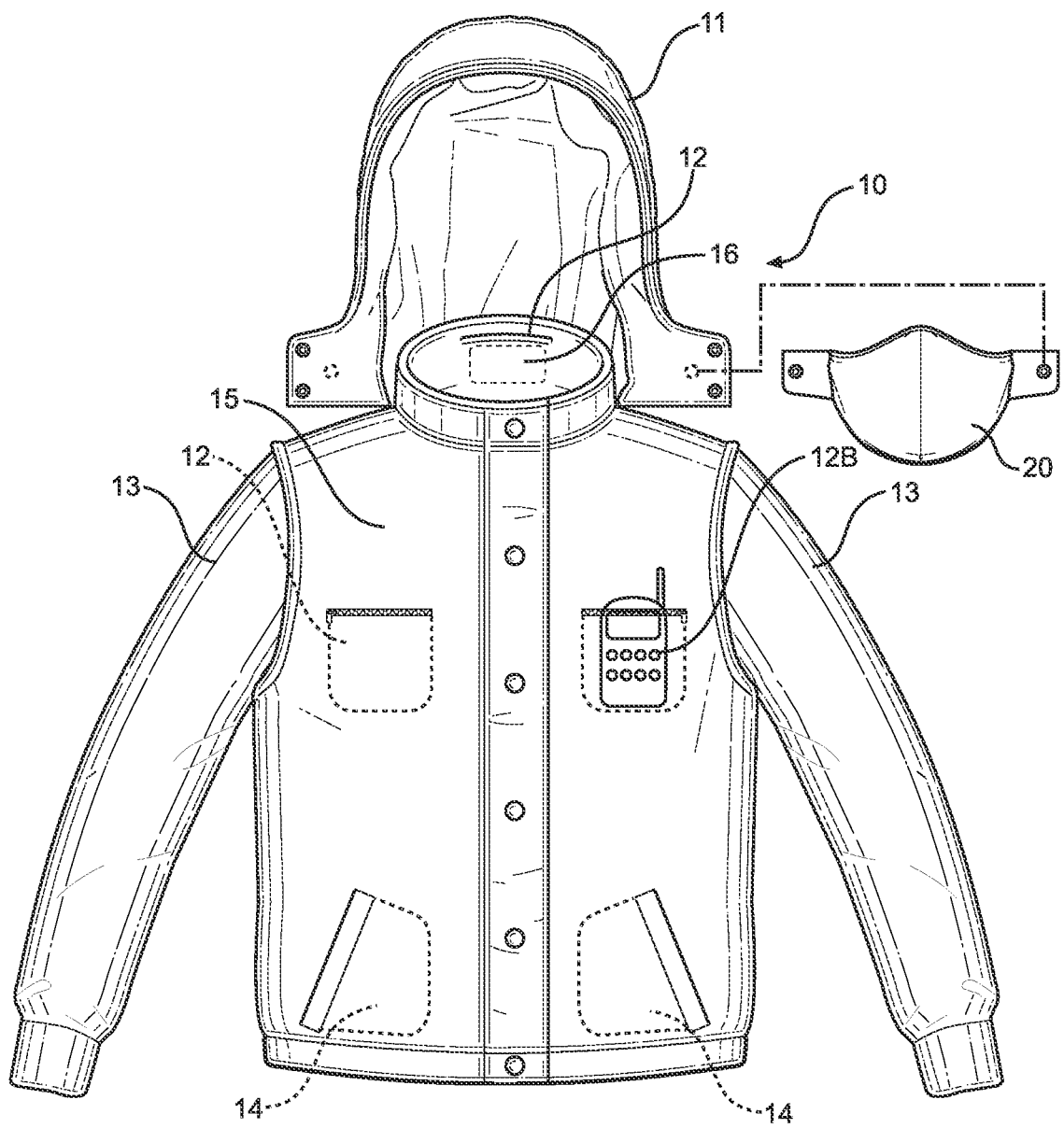
FIG. 1 is a front elevation view of an exemplary embodiment of the present invention.
Figure 2:
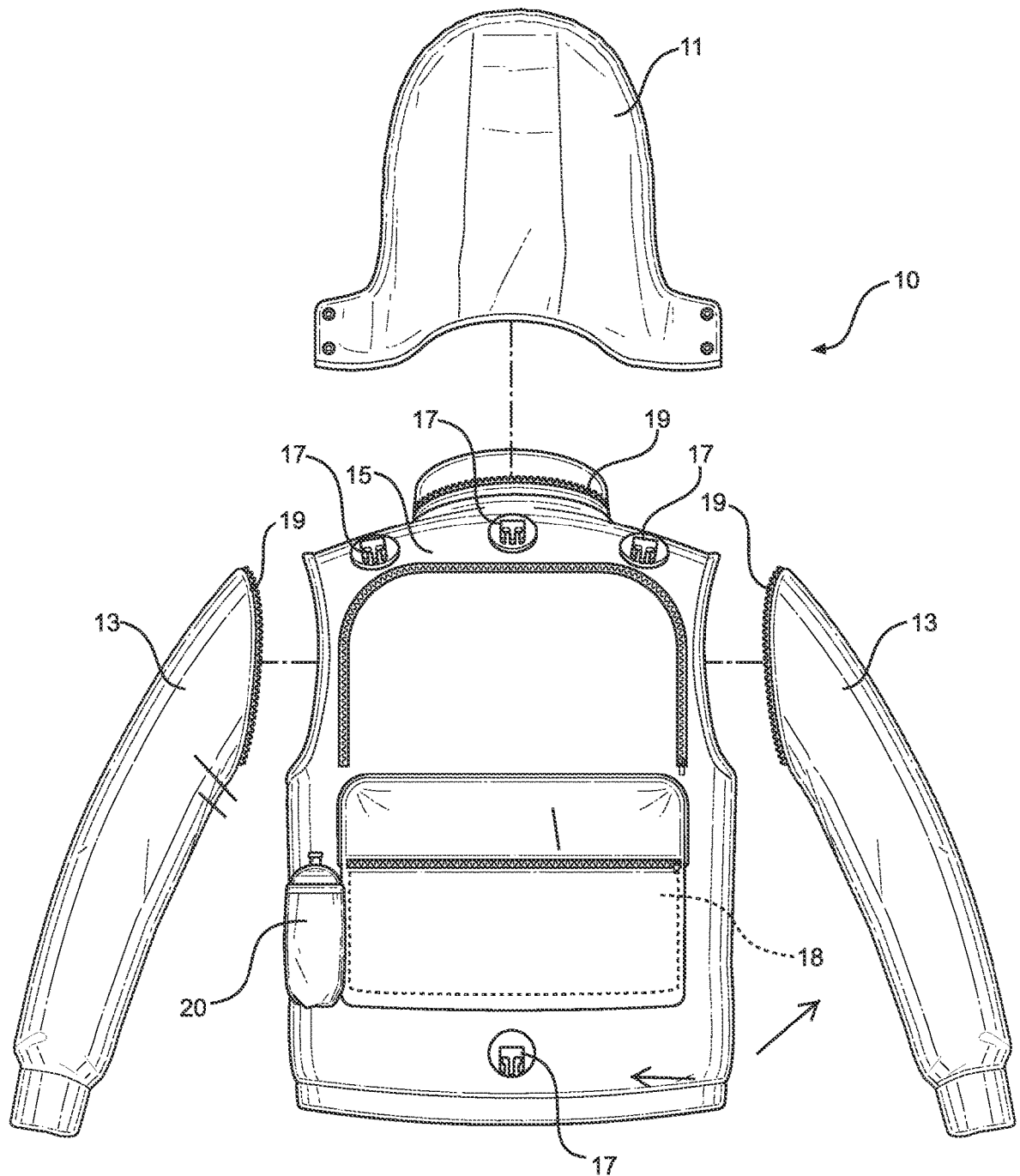
FIG. 2 is an exploded rear view of an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides restraint system for simultaneously maintaining a plurality of animate objects in an untangled position while the user is hands free. The present invention embodies a 360-degree waist harness that operatively associates with a plurality of retractable bungee assemblies, each bungee assembly adapted to removably attach to a comprehensive vest or harness or a child or a pet, respectively. The bungee assemblies are selectively releasable from the 360-degree belt or the comprehensive vest or harness.

Referring now to FIGS. 1 through 9, the present invention may include a restraint system 100 for simultaneously maintaining a plurality of animate objects in an untangled position relative to a guardian wearing a 360-degree belt.

The restraint system 100 may include at least one wearable harness 10, a 360-degree belt 30, and a bungee assembly 70 operatively associated each wearable harness 10 to the 360-degrees belt 30.

A fanny pack 34 may be attached to the 360-degree belt 30 by way of a detachable fastener 23, such as a zipper. A bottle attachment 35 may be provided by the 360-degree belt 30.

An umbrella lever 41 may be provided along the outward facing surface of the 360-degree belt 30. The umbrella lever 41 may be configured so that the associated support arm 22 (and thus bungee assembly 70) is movable between a closed (umbrella) condition and an open condition. The open condition is what is shown in the drawings. The closed condition is when the support arms 22 are directed downwardly (rotating about the pivotable connection 60) so as to be adjacent and somewhat parallel with the wearer's legs; much like an umbrella is movable between a retracted closed condition and an open condition. A stop lever 40 may be spaced along an outward-facing surface of the 360-degree belt 30, where each stop lever 40 may be configured as a stop/release button or valve for the movement of said support arms 22 throughout their movement between the closed condition and the open condition.

Figure 7:
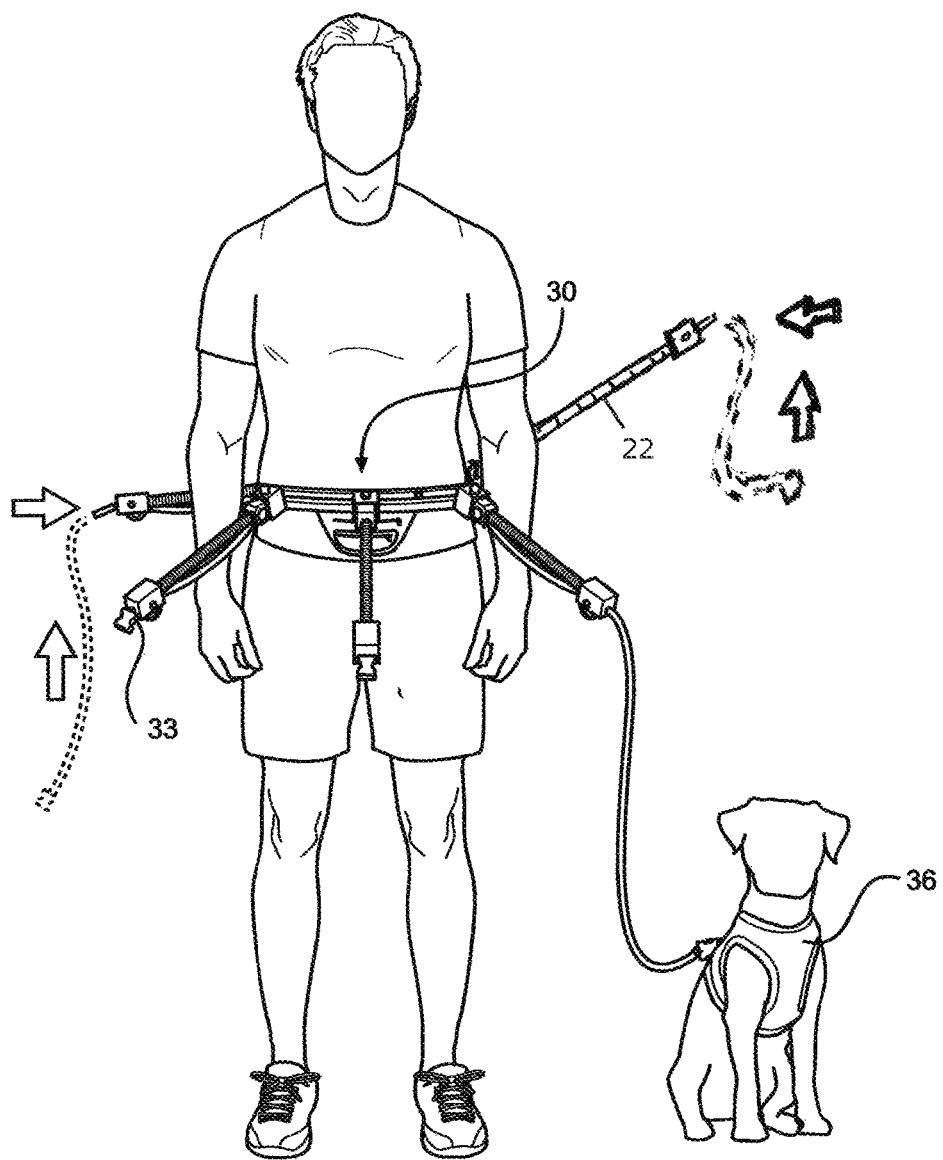
FIG. 7 is a front elevation view of an exemplary embodiment of the present invention, illustrating a retraction of a bungee.

A lift lever 42 may be provided along the outward facing surface of the 360-degree belt 30. The lift lever 42, swings the bungee assembly 70 upward, about the pivotable connection 60, in a vertically upward position, as illustrated in FIG. 7. This help avoid entanglement among a plurality of elastic bungees 32, as a first support arm 22 may be raised, while an adjacent second support arm 22 is not, so that the first and second support arms 22 and their operatively associated elastic bungees 32 do not become tangled.

Figures 3, 4:
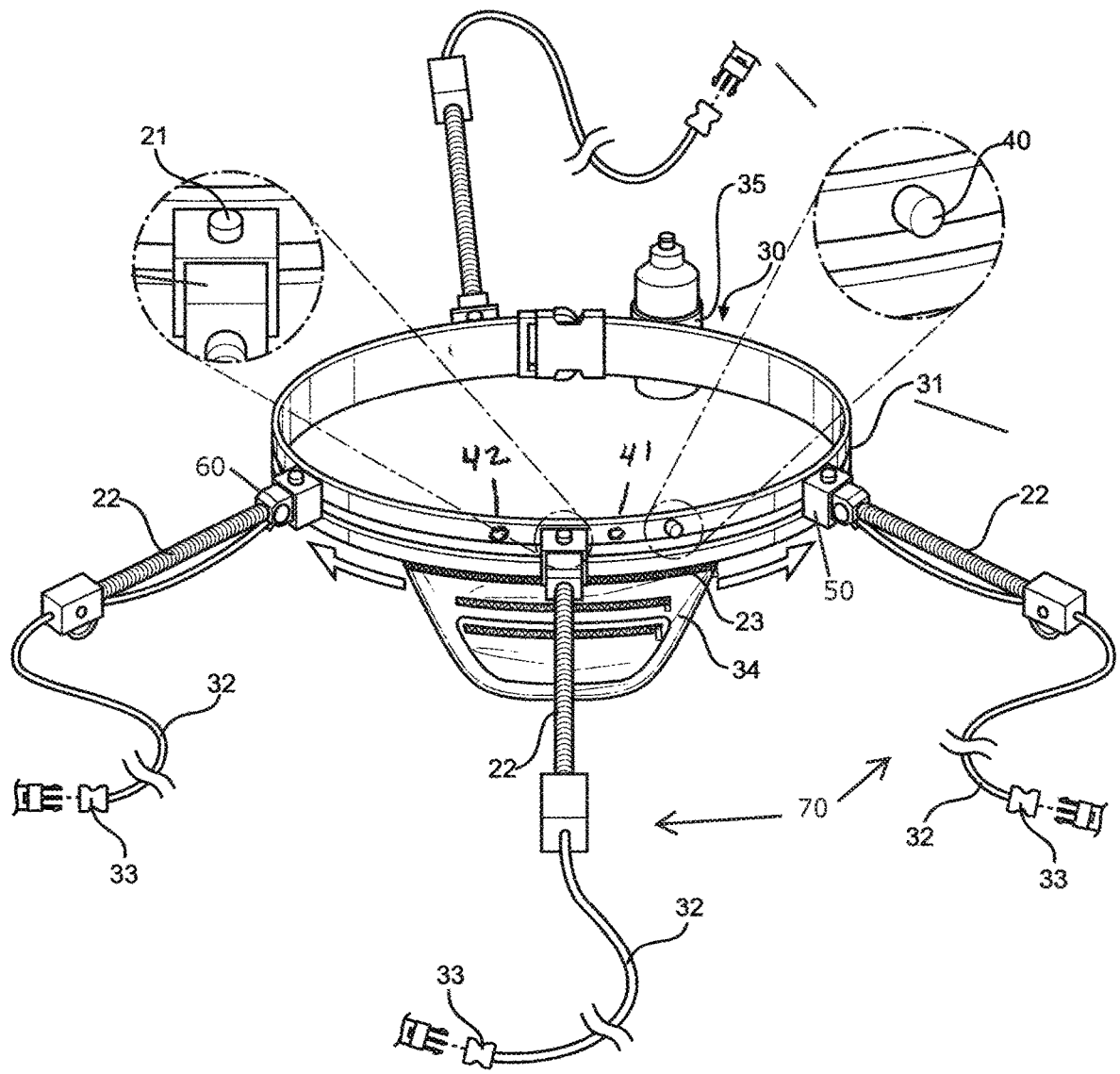
FIG. 3 is a front elevation view of an exemplary embodiment of an e-tag and GPS tracker of the present invention.
FIG. 4 is a perspective view of an exemplary embodiment of a 360-belt of the present invention.
Figure 5:
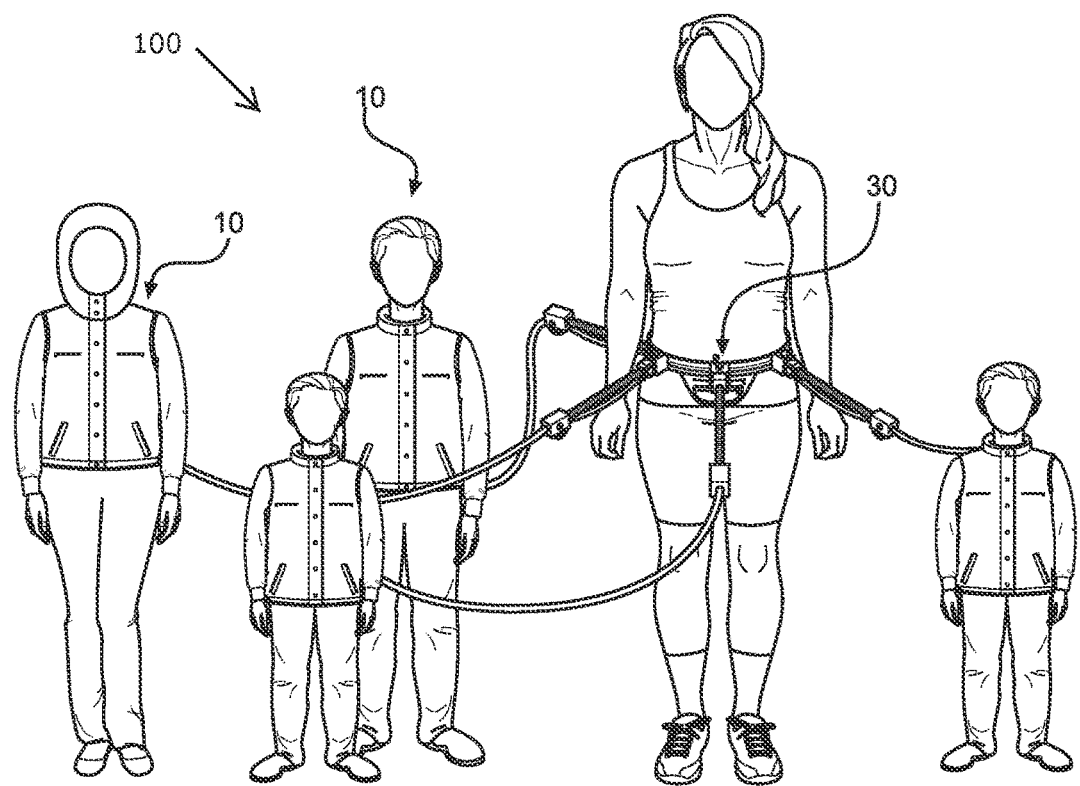
FIG. 5 is a front elevation view of an exemplary embodiment of the present invention, illustrating a vest attachment.
Figure 6:
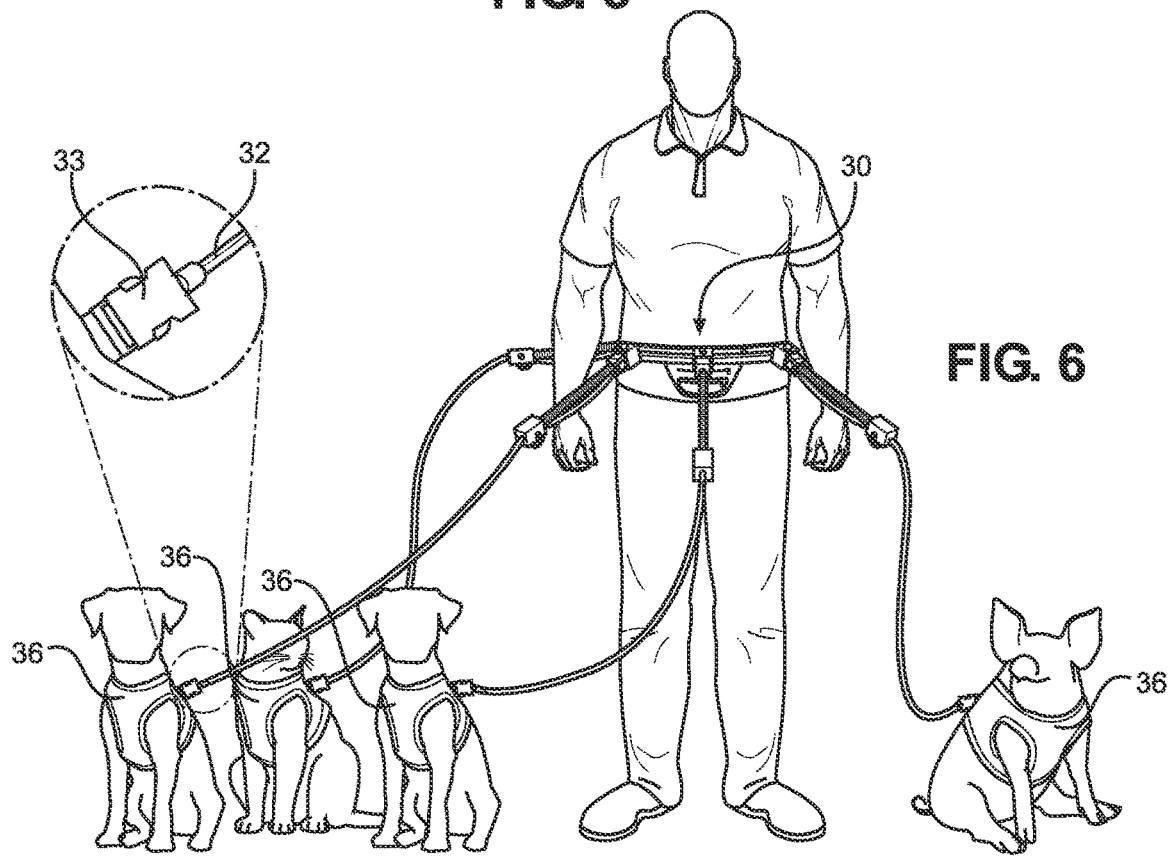
FIG. 6 is a front elevation view of an exemplary embodiment of the present invention, illustrating a harness attachment.

A slide connector 50 may operatively associated with the outward-facing track 31 of the 360-degree belt 30 so that each slide connector 50 (and of course connected bungee assembly 70) can slide along the track 31, as indicated by the arrows in FIG. 4. The slide connector 50 slidably rides along the track 31. The slide connector 50 may provide a retractable stop/release button 21 that is operatively associated with an elastic bungee 32 of the bungee assembly 70.

The bungee assembly 70 may pivotably connect by way of a pivotable connection 60 to the slide connector 50. A proximate end of a support arm 22 may connect to the pivotable connection 60. The support arm 22 extends radially from the 360-degree belt 30. The support arm 22 rotates upwardly and downwardly (relative to a wearer of the 360-degree belt 30). The distal end of the support arm 22 may provide a connection to an elastic bungee 32 that terminates in a bungee connector 33.

For human users, the wearable harness 10 may take the form of an upper garment 15 with, in certain embodiments, arms 13, pockets 14, and a detachable fastener 19 removably attaching a hood 11 to the upper garment 15. In certain embodiments, the wearable harness 10 may include a three layered safety mask 20 and a backpack 18. The wearable harness 10 may provide a built-in communication device 12B, like a walkie talkie, above the breastbone of the wearer of the wearable harness 10.

For animals, the wearable harness 10 may be an animal vest 36 which hugs the four legged. The animal vest 36 and the upper garment 15 each provide at least one attachment point 17 configured to be adjacent an upper back or rear portion of the wearer. The wearable harness 10, upper garment 15 and animal vest 36, may provide a hidden pocket 12 that contains an e-tag 16.

The bungee connector 33 is dimensioned and adapted to removably connect to any one attachment point 17.

The e-tag 16 may provide a control circuitry and/or processor with a form of memory that can provide global positioning coordinates. Global Positioning System (GPS) technology is configured to track the e-tag 16 through a systemic software downloadable on a computing device.

As part of the overall system, it is contemplated that the guardian wearing the 360-degree belt has a rechargeable communication device 55, such as walkie-talkie watch, to communicate with the above-mentioned communication device 12B. The rechargeable communication device can be stored in the fanny pack 34. Survival items can be stored in the above-mentioned fanny pack 34, pockets 14, and the like. Likewise, a water bottle can be secured by the bottle attachment 35. The fanny pack has a pocket for and may include a rechargeable portable charger or power bank(s) with USB cords compatible to IPhone and Android users for on-the-go convenient use.

In certain embodiments, the 360-degree revolution belt 30 has a plastic belt holster and the inlay an comes in sizes XS-XXXXL. The 360-degree revolution belt 30 has quick release buckles, clips, and slide release. Overlapping medium-large loops will have 3-4 attached stop release applicators with 3-4 feet retractable elastic bungee cords 32 with quick release, clips, and slide release applicators that securely attach to the child's upper garment 15 and the four-legged friends huggable torso harness 36. The umbrella lever 41 creates an umbrella-like effect to deter tangling and provides a carousel effect or appearance in the open condition, and a stop lever 40 may selectively lock each bungee assembly 70 from riding along the track 31. The collective functionality of the umbrella lever 41, the lift lever 42 and the stop lever 40 afford the guardian wearer of the 360-degrees belt 30 can prevent entanglement in the face of the revolution that forces the natural momentum of active kids and unruly four-legged friends cause.

The removable fanny pack 34 covers the pelvis area and is attaches to the plastic belt holster. The medium to large sized fanny pack has compartments for a mobile device (for which the above-mentioned systemic tracking application will be downloaded), a bottle attachment 35 (e.g., netted pocket) for a 8 Oz PET plastic bottle, built in wallet and change purse, clip for keys, and a small zippered pocket for personals.

The upper garment 15 may be all-weather, insulated outerwear. Back of the vest has a shoulder length zipper that engages a hidden backpack. Below the back, above the tail bone, is a synched area where the quick release, clips, and slide release valve is located. In front of the vest, above the normal pockets are zipped pockets. These zipped pockets are lined with PET plastic for easy cleaning. Snacks, toys, other items can be stored for freshness and protected from the elements. Vertical to the zipper is a net, where a 4 oz PET water bottle is housed for easy access. The vest zips to cover the neck like a built-in scarf. Inside the neck piece a hoodie, stored away with a zipper. Inside the vest, under the size tag is a hidden flap where the child's identifying information lies and under that flap is GPS tracking technology. The flap may be weather and waterproof.

The animal vest 36 may embody an adjustable harness forms a large letter 'I' formation down the torso, with quick release, clips, and slide release connect under the body, underneath the rib cage. The top part goes through each leg, connected underneath with quick release buckles, clips, and slides release, around the breastbone, beneath the neck. A quick release buckle, clip, and slide release valve securely connects to the bungee. A loop for the Paw shaped GPS ID (e-tag 16) may be located between the shoulder blades.

Figure 8:
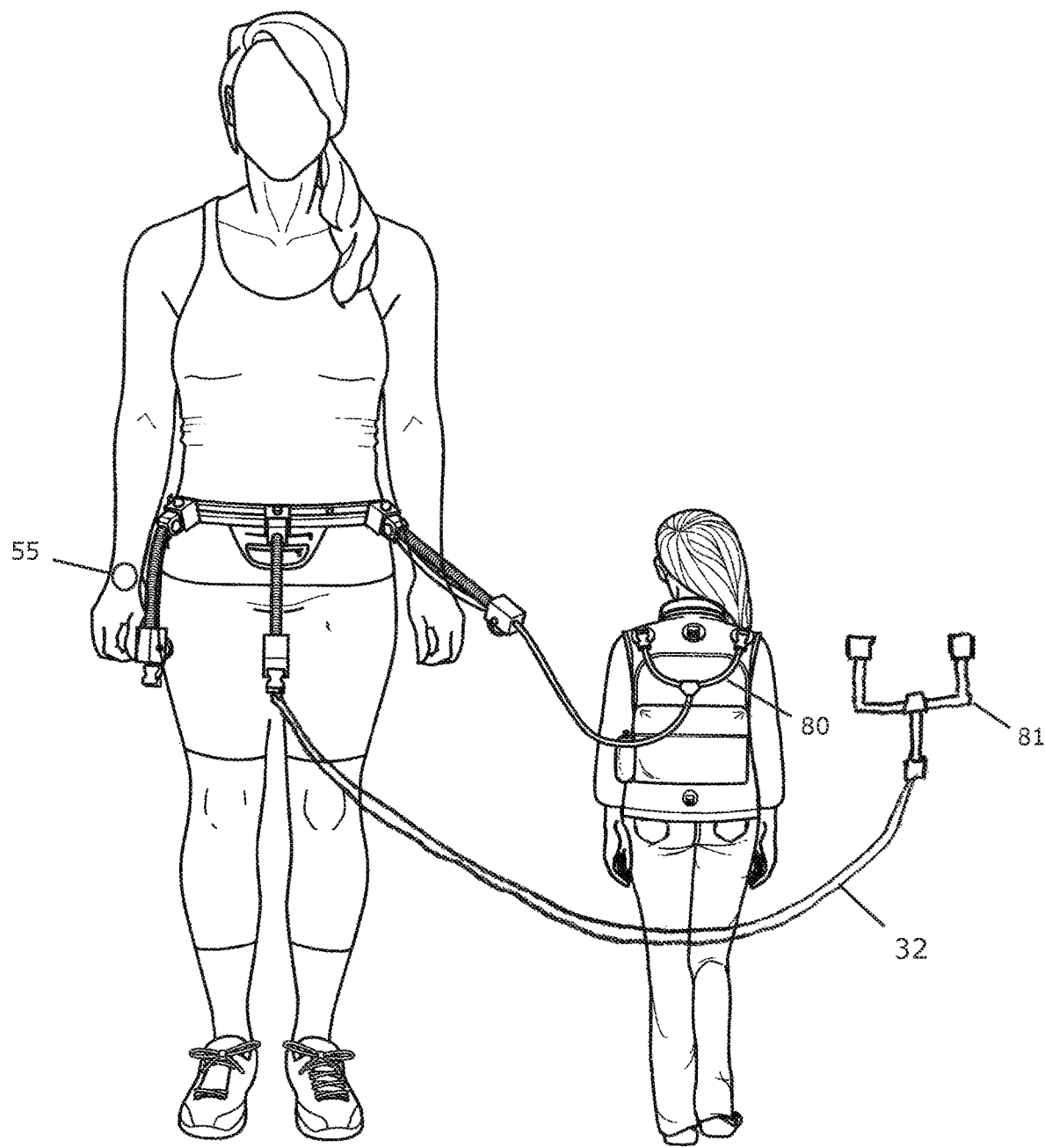
FIG. 8 is a front elevation view of an exemplary embodiment of the present invention.
Figure 9:
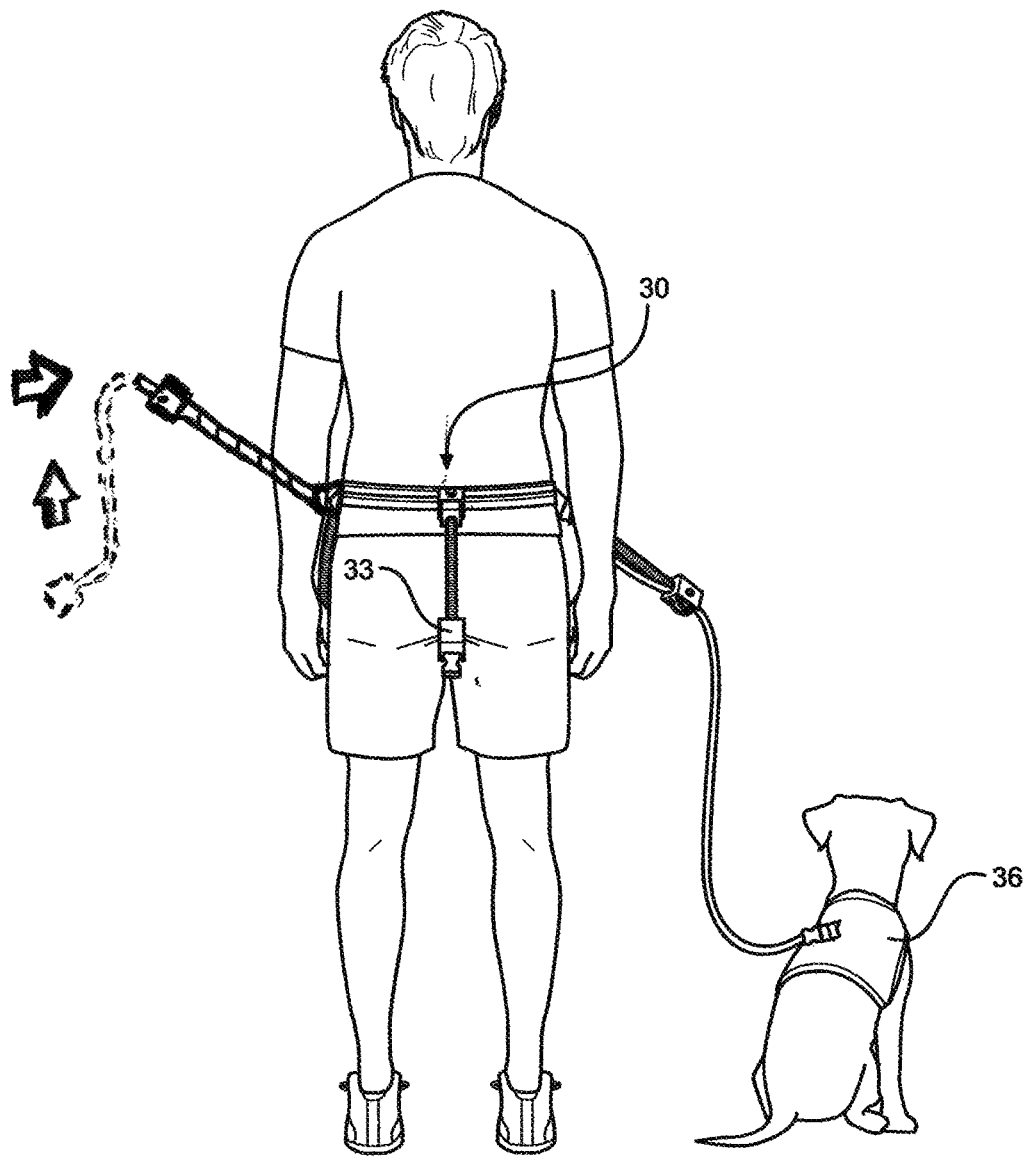
FIG. 9 is a rear elevation view of an exemplary embodiment of the present invention.

A "constrict" bar 80, as illustrated in FIG. 8, may be dimensioned to simultaneously connect to two spaced apart attachment points 17 disposed adjacent the shoulder blades of the child or pet wearer of the wearable harness 10. The constrict bar 80 interconnects the bungee connector 33 and the two spaced apart attachment points 17 in such a way as to serve as a firm hold in the child's or pet's mind, urging them to move in a direction controlled by the guardian, directing their momentum. The constrict bar 80 through shown having a 'U'-shape, may also have a T-shape 82 or a squared off 'U'-shape or a 'Y'-shape. The constrict bar 80 enables a raise and lift effect across the shoulder (above the shoulder gently and possibly touching the head when in use)—"rise and lift" effect is for safety and preventing tangling of the elastic bungees 32. The constrict bar 80 may vary in size as a function of the wearable harness 10. The constrict bar 80 may be reinforced with plastic piping.

The present invention allows parents with multiple children to remain hands free, while kids are free to play within proximity, and protected with the vest when released from the mechanism. The same goes for four legged friends as well. The guardian's fanny pack 34 may have three safe and secure attach/detach buckles with controlled stop/retractable elasticated bungees. The bungee technology is attached to the 360-degree revolving belt 30. The bungees extend up to four feet. Parents may use the fanny pack to store essentials (e.g., wallets, medication, cell phones, etc.). The fanny pack 34 has the capability to detach from the 360-degree revolving belt 30 for convenience.

The retractable elastic bungee cords 32 may have a core of elastic strands that are covered in a nylon or cotton sheath that may be knitted, braided or woven and can incorporate elements of stretch.

Additionally, the present invention can be used to restrain and control any assortment of animated objects; for instant, a farmer may use the present invention with herds.

It should be understood, of course, that the foregoing relates to exemplary embodiments of the invention and that modifications may be made without departing from the spirit and scope of the invention as set forth in the following claims.

What is claimed is:

1. A wearable restraint system for simultaneously maintaining a plurality of living beings in an untangled position, the wearable restraint system comprising:
   a waist belt having a track around substantially an entire circumference of the waist belt;
   one or more bungee assemblies operatively associated with the track in such a way that each bungee assembly rides along the track;
   each bungee assembly having an elastic portion that terminates in a bungee connector;
   one or more wearable harnesses, each wearable harness having one or more attachment points configured to be adjacent a shoulder blade of a living being wearing the wearable harness, wherein each attachment point is configured to removable connect to each bungee connector, wherein each bungee assembly has a support arm extending between the elastic portion and a pivotable connection; and
   a retractable stop/release button on each bungee assembly, wherein the retractable stop/release button is configured to extend, retract, and lock the elastic portion.

2. The wearable restraint system of claim 1, further comprising a constrict bar having a Y-shape, wherein a leg of the Y-shape has an attachment point, wherein two arms of the Y-shape each have a bungee connector, and wherein the one or more attachment points comprise two attachment points, each attachment point configured to be adjacent a respective shoulder blade of said living being.

3. The wearable restraint system of claim 1, wherein each wearable harness comprises a hidden e-tag.

* * * * *